(12) United States Patent
Aizawa

(10) Patent No.: US 11,825,063 B2
(45) Date of Patent: Nov. 21, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Michio Aizawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/704,227

(22) Filed: Mar. 25, 2022

(65) Prior Publication Data

US 2022/0321855 A1 Oct. 6, 2022

(30) Foreign Application Priority Data

Apr. 2, 2021 (JP) ................................. 2021-063433

(51) Int. Cl.
*H04N 13/111* (2018.01)
*H04N 13/349* (2018.01)
*H04N 13/282* (2018.01)

(52) U.S. Cl.
CPC ......... *H04N 13/111* (2018.05); *H04N 13/282* (2018.05); *H04N 13/349* (2018.05)

(58) Field of Classification Search
CPC .. H04N 13/111; H04N 13/282; H04N 13/349; H04N 23/90; H04N 5/2628
USPC ......................................................... 348/47
See application file for complete search history.

(56) References Cited

U.S. PATENT DOCUMENTS

| 9,521,234 B2 | 12/2016 | Aizawa et al. | |
| 10,491,830 B2 | 11/2019 | Aizawa | |
| 10,999,535 B2 * | 5/2021 | Shuden | H04N 5/272 |
| 2017/0171570 A1 * | 6/2017 | Mitsumoto | H04N 23/611 |
| 2018/0176545 A1 * | 6/2018 | Aflaki Beni | H04N 23/60 |
| 2018/0259339 A1 * | 9/2018 | Johnson | G05D 1/0692 |
| 2018/0343442 A1 * | 11/2018 | Yoshikawa | H04N 21/438 |
| 2019/0311526 A1 * | 10/2019 | Sugio | H04N 13/194 |
| 2020/0068188 A1 * | 2/2020 | Maeda | G06T 15/20 |

(Continued)

FOREIGN PATENT DOCUMENTS

JP 2002-224260 A 8/2002

Primary Examiner — Tung T Vo
(74) Attorney, Agent, or Firm — Carter, DeLuca & Farrell LLP

(57) ABSTRACT

An image processing apparatus comprising: an identifying unit that identifies, from multiple image capture apparatuses that capture images of an image capture space from multiple directions, two or more image capture apparatuses that capture images of a predetermined position in the image capture space; a camera path setting unit that sets multiple viewpoints that are based on the two or more image capture apparatuses identified by the identifying unit; a virtual viewpoint image generating unit that generates multiple viewpoint images corresponding to the multiple viewpoints based on three-dimensional shape data generated using multiple images captured by the multiple image capture apparatuses; and an image capture apparatus selecting unit that selects, from the two or more image capture apparatuses identified by the identifying unit, an image capture apparatus close to the position of the viewpoint corresponding to a viewpoint image designated by a user from the multiple viewpoint images.

18 Claims, 10 Drawing Sheets

(56) References Cited

U.S. PATENT DOCUMENTS

| | | | |
|---|---|---|---|
| 2020/0177928 A1* | 6/2020 | Shin | H04N 21/816 |
| 2020/0193671 A1* | 6/2020 | Tamir | G06T 7/251 |
| 2020/0250798 A1* | 8/2020 | Lasang | G06T 5/006 |
| 2021/0352323 A1* | 11/2021 | Sugio | H04N 19/182 |
| 2022/0030214 A1* | 1/2022 | Sinharoy | H04N 21/6587 |

* cited by examiner

| CAMERA IDENTIFIER | FOCAL LENGTH | POSITION | | | ORIENTATION | | | |
|---|---|---|---|---|---|---|---|---|
| | | x | y | z | W | X | Y | Z |
| 001 | : | : | : | : | : | : | : | : |
| 002 | : | : | : | : | : | : | : | : |
| 003 | : | : | : | : | : | : | : | : |
| : | : | : | : | : | : | : | : | : |
| : | : | : | : | : | : | : | : | : |

FIG.4

IMAGE PROCESSING APPARATUS, IMAGE PROCESSING METHOD, AND STORAGE MEDIUM

BACKGROUND OF THE DISCLOSURE

Field of the Disclosure

A technique of the present disclosure relates to image processing based on captured images.

Description of the Related Art

In competitive sports, an instant-replay using captured images is sometimes used for judgments.

Japanese Patent Laid-Open No. 2002-224260 discloses using two cameras to judge offside in competitive sports.

In a conceivable method, a plurality of cameras are installed at a field where a competitive sport takes place, a camera is selected from the plurality of cameras as a camera that was used to capture an image useful for judging a foul or the like in the competitive sport, and the image captured by the selected camera is used for the judgment. However, with more cameras, there is more work involved in finding the camera that was used to capture an image useful for the judgment.

SUMMARY OF THE DISCLOSURE

The present disclosure provides an image processing apparatus comprising at least one processor or circuit configured to function as: an identifying unit configured to identify, from a plurality of image capture apparatuses that capture images of an image capture space from a plurality of directions, two or more image capture apparatuses that capture images of a predetermined position in the image capture space; a setting unit configured to set a plurality of viewpoints that are based on the two or more image capture apparatuses identified by the identifying unit; a generating unit configured to generate a plurality of viewpoint images corresponding to the plurality of viewpoints based on three-dimensional shape data generated using a plurality of images captured by the plurality of image capture apparatuses; and a selecting unit configured to select an image capture apparatus from the two or more image capture apparatuses identified by the identifying unit based on at least one of position of a viewpoint and eye direction from the viewpoint, the viewpoint corresponding to a viewpoint image designated by a user from the plurality of viewpoint images.

Further features of the present disclosure will become apparent from the following description of exemplary embodiments with reference to the attached drawings.

BRIEF DESCRIPTION OF THE DRAWINGS

FIG. 4 is a diagram illustrating viewpoint information on the plurality of image capture apparatuses;

DESCRIPTION OF THE EMBODIMENTS

With reference to the drawings attached hereto, a technique of the present disclosure is described below in detail based on embodiments. The embodiments below are provided merely to demonstrate an example of a specific mode for carrying out the technique of the present disclosure and are not to be interpreted as limiting the technical scope of the present disclosure. The technique of the present disclosure can be carried out in various modes without departing from its technical ideas or main features.

<Embodiment 1>

[Hardware Configuration]

Figure 1:
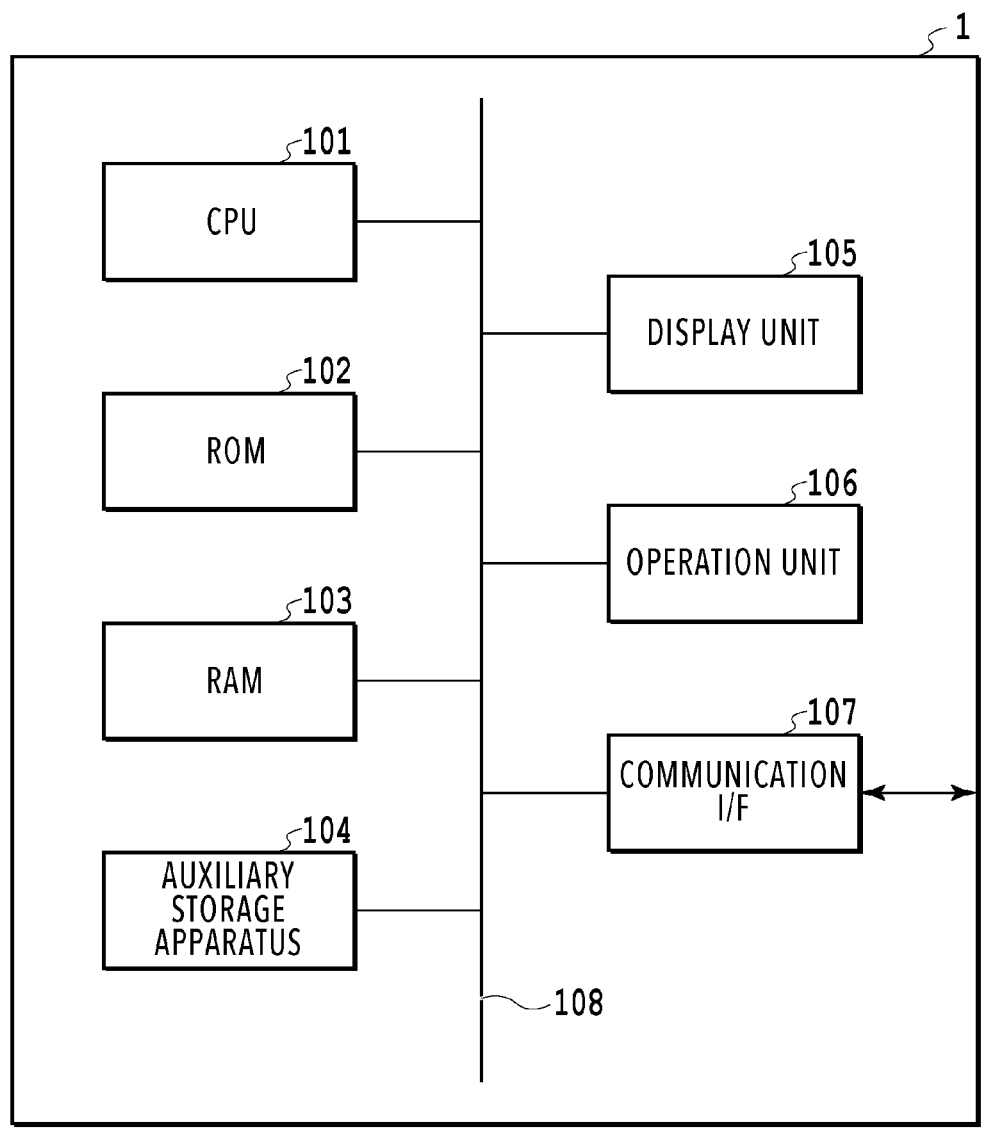
FIG. 1 is a diagram illustrating the hardware configuration of an image processing apparatus.

FIG. 1 is a diagram illustrating the hardware configuration of an image processing apparatus 1 of the present embodiment. The image processing apparatus 1 has a CPU 101, a ROM 102, a RAM 103, an operation unit 106, a display unit 105, an auxiliary storage apparatus 104, a communication I/F 107, and a bus 108.

The functions of the image processing apparatus 1 are achieved by the CPU 101 performing overall control of the image processing apparatus using computer programs and data stored in the ROM 102 and the RAM 103.

Note that the image processing apparatus may have one or more pieces of dedicated hardware different from the CPU 101, so that the dedicated hardware executes at least part of the processing executed by the CPU 101. Examples of such dedicated hardware include an application-specific integrated circuit (ASIC), a field-programmable gate array (FPGA), and a digital signal processor (DSP).

The ROM 102 stores programs and the like that do not need changes. The RAM 103 temporarily stores, e.g., programs and data supplied from the auxiliary storage apparatus 104 and data supplied from the outside via the communication I/F 107. The auxiliary storage apparatus 104 is formed by, for example, a hard disk drive (HDD) or the like and stores various kinds of data, such as image data and audio data.

The display unit 105 is formed by, for example, a liquid crystal display, a light-emitting diode (LED), or the like, and displays, e.g., a graphical user interface (GUI) used by a user to operate the image processing apparatus. The operation unit 106 is formed by, for example, a keyboard, a mouse, a joy stick, a touch panel, and/or the like. The operation unit 106 receives a user operation and accordingly inputs various types of instructions to the CPU 101.

The communication I/F 107 is used for communications with an apparatus external to the image processing apparatus 1. For example, in a case where the image processing apparatus 1 is connected to an external apparatus in a wired manner, the communication cable is connected to the communication I/F 107. In a case where the image processing apparatus 1 has a function to perform wireless communications with an external apparatus, the communication I/F 107 includes an antenna. The bus 108 connects the units of the image processing apparatus 1 to one another to communicate information.

[Functional Configuration]

Figure 2:
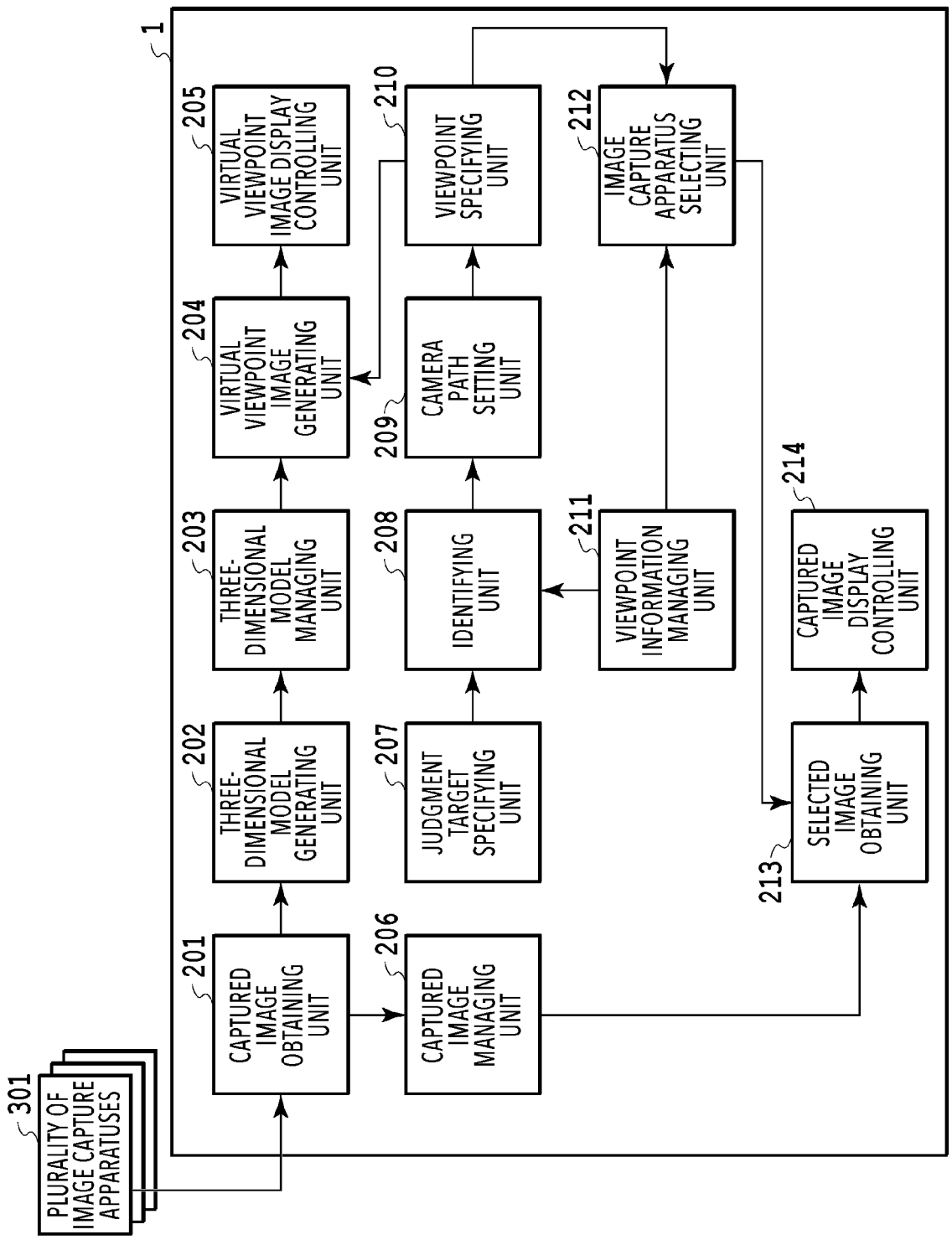
FIG. 2 is a diagram illustrating the functional configuration of the image processing apparatus.

FIG. 2 is a diagram illustrating the functional configuration of the image processing apparatus 1. The image processing apparatus 1 has a captured image obtaining unit 201, a three-dimensional model generating unit 202, a three-dimensional model managing unit 203, a virtual viewpoint image generating unit 204, a virtual viewpoint image display controlling unit 205, a captured image managing unit 206, a judgment target specifying unit 207, and an identifying unit 208. The image processing apparatus 1 further has a camera path setting unit 209, a viewpoint specifying unit 210, a viewpoint information managing unit 211, an image capture apparatus selecting unit 212, a selected image obtaining unit 213, and a captured image display controlling unit 214.

The image processing apparatus 1 of the present embodiment is an image processing apparatus capable of generating virtual viewpoint images. A virtual viewpoint image is an image as viewed from a viewpoint of a non-existent image capture apparatus being located at a different position and having a different orientation from image capture apparatuses that are actually installed (such a viewpoint is also referred to as a virtual viewpoint). A virtual viewpoint image is also called a free-viewpoint image or an arbitrary-viewpoint image. A virtual viewpoint image may either be a video or a still image.

The captured image obtaining unit 201 obtains captured images captured by a plurality of image capture apparatuses 301 (see FIG. 3) in temporal synchronization.

Figure 3:
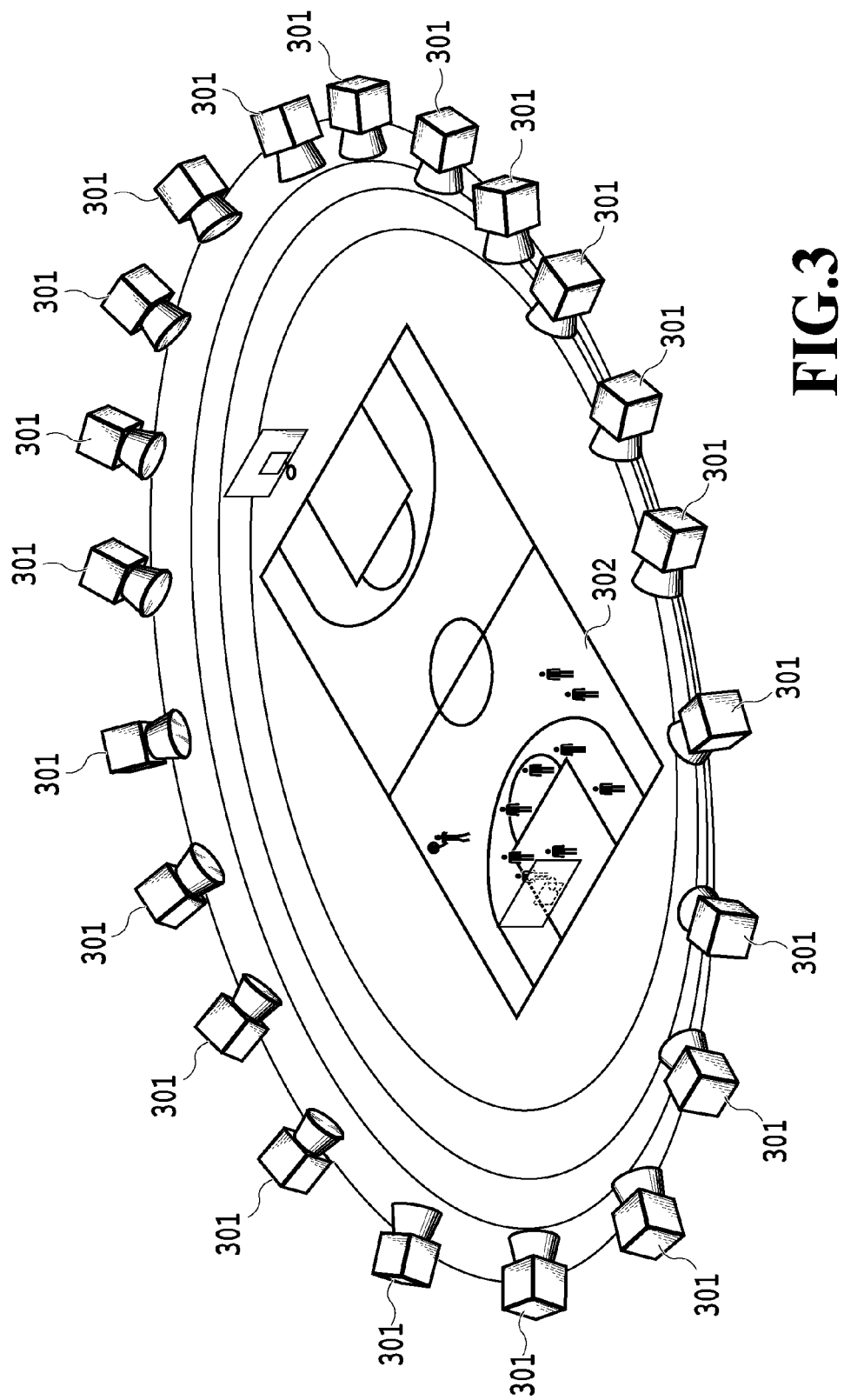
FIG. 3 is a diagram illustrating the arrangement of a plurality of image capture apparatuses.

FIG. 3 is a diagram illustrating the plurality of image capture apparatuses 301. The plurality of image capture apparatuses 301 are a plurality of image capture apparatuses that capture images of an image capture space 302, and are, for example, a plurality of digital cameras capable of capturing captured images such as still images or moving images. The image capture space 302 is, for example, a field in a stadium where a basketball game takes place. As shown in FIG. 3, in a case where the image capture space 302 is a stadium field, the plurality of image capture apparatuses 301 are disposed around the stadium field to capture images of the field from various angles in temporal synchronization. As a result, captured images from a plurality of viewpoints at the same time can be obtained.

The plurality of captured images obtained by the captured image obtaining unit 201 are outputted to the three-dimensional model generating unit 202 and the captured image managing unit 206. Each captured image has added thereto auxiliary information including the identifier of the image capture apparatus that captured the captured image and the image capture time. The captured image managing unit 206 stores the obtained captured images in a storage unit and manages them. The captured image managing unit 206 manages the images in a storage unit formed by, for example, a solid-state drive (SSD) or an HDD to be able to manage a large quantity of images.

The three-dimensional model generating unit 202 generates three-dimensional models of objects in the image capture space 302 based on the plurality of images captured at the same time. The objects may be a player, a referee, a ball, and the like. The three-dimensional model generating unit 202 generates the three-dimensional models using, for example, the visual hull method. The three-dimensional model managing unit 203 stores the generated three-dimensional models in a storage unit and manages them. The data amount of three-dimensional models managed by the three-dimensional model managing unit 203 is smaller than that of the captured images managed by the captured image managing unit 206. Thus, the three-dimensional models may be stored and managed in a database capable of faster access than the storage unit used by the captured image managing unit 206.

The viewpoint information managing unit 211 manages viewpoint information on each of the image capture apparatuses included in the plurality of image capture apparatuses 301. A viewpoint represents, e.g., the position of an image capture apparatus and the orientation of the image capture apparatus (the eye direction from the position of the viewpoint), and viewpoint information includes at least parameters representing focal length, position, and orientation.

FIG. 4 is a diagram showing a table for managing viewpoint information on each image capture apparatus included in the plurality of image capture apparatuses 301. Each row of the table in FIG. 4 holds viewpoint information on one image capture apparatus included in the plurality of image capture apparatuses 301. A camera identifier is identification information that uniquely identifies an image capture apparatus. Focal length, position, and orientation are viewpoint information related to the image capture apparatus indicated by the identifier. For example, the position of an image capture apparatus is managed using coordinates (x, y, z) in the image capture space 302, and the orientation of an image capture apparatus is managed using quaternions (W, X, Y, Z).

The judgment target specifying unit 207 specifies a user-specified position in the image capture space 302.

The identifying unit 208 identifies, from the plurality of image capture apparatuses 301, an image capture apparatus whose image capture range includes the position specified by the judgment target specifying unit 207. The present embodiment describes a case where the identifying unit 208 identifies, from a plurality of image capture apparatuses, two or more image capture apparatuses that capture images of the position specified in the image capture space.

The camera path setting unit 209 sets a plurality of viewpoints that are based on the viewpoints of the image capture apparatuses identified by the identifying unit 208. An arrangement of the plurality of set viewpoints is called a camera path. A description will be given later about a camera path.

The viewpoint specifying unit 210 specifies one of the plurality of viewpoints forming the camera path set by the camera path setting unit 209 and outputs the specified viewpoint to the virtual viewpoint image generating unit 204. The virtual viewpoint image generating unit 204 renders three-dimensional models and generates a viewpoint image which is an image showing the view from the viewpoint specified by the viewpoint specifying unit 210. By repeating the specification of a viewpoint and generation of a virtual viewpoint image from the viewpoint specified, viewpoint images representing the view from a viewpoint moving along the camera path are generated. The virtual viewpoint image display controlling unit 205 displays the generated viewpoint images on the display unit 105. Although there is a case where the viewpoint specified by the viewpoint specifying unit 210 is the viewpoint of an image capture apparatus, an image generated by the virtual viewpoint image generating unit 204 is referred to as a virtual viewpoint image for the convenience of illustration.

The image capture apparatus selecting unit 212 selects an image capture apparatus from the plurality of image capture apparatuses 301. In the event where a viewpoint image showing a desired scene is displayed while viewpoint images are displayed one after another on the display unit 105, a user designates the viewpoint image. The image capture apparatus selecting unit 212 selects an image capture apparatus based on the viewpoint used to generate the viewpoint image designated by the user. Note that the image capture apparatus selecting unit 212 may select more than one image capture apparatus.

From the captured image managing unit 206, the selected image obtaining unit 213 obtains the captured image captured by the image capture apparatus selected by the image capture apparatus selecting unit 212. The captured image display controlling unit 214 performs control so that the image obtained by the selected image obtaining unit 213 may be displayed on the display unit 105.

The functions of the units in FIG. 2 are implemented by the CPU of the image processing apparatus 1 by loading program code stored in the ROM into the RAM and executing the program code. Alternatively, some or all of the functions of the units in FIG. 2 may be implemented by hardware such as an ASIC or an electric circuit.

[Image Capture Apparatus Selecting Processing]

Figure 5:
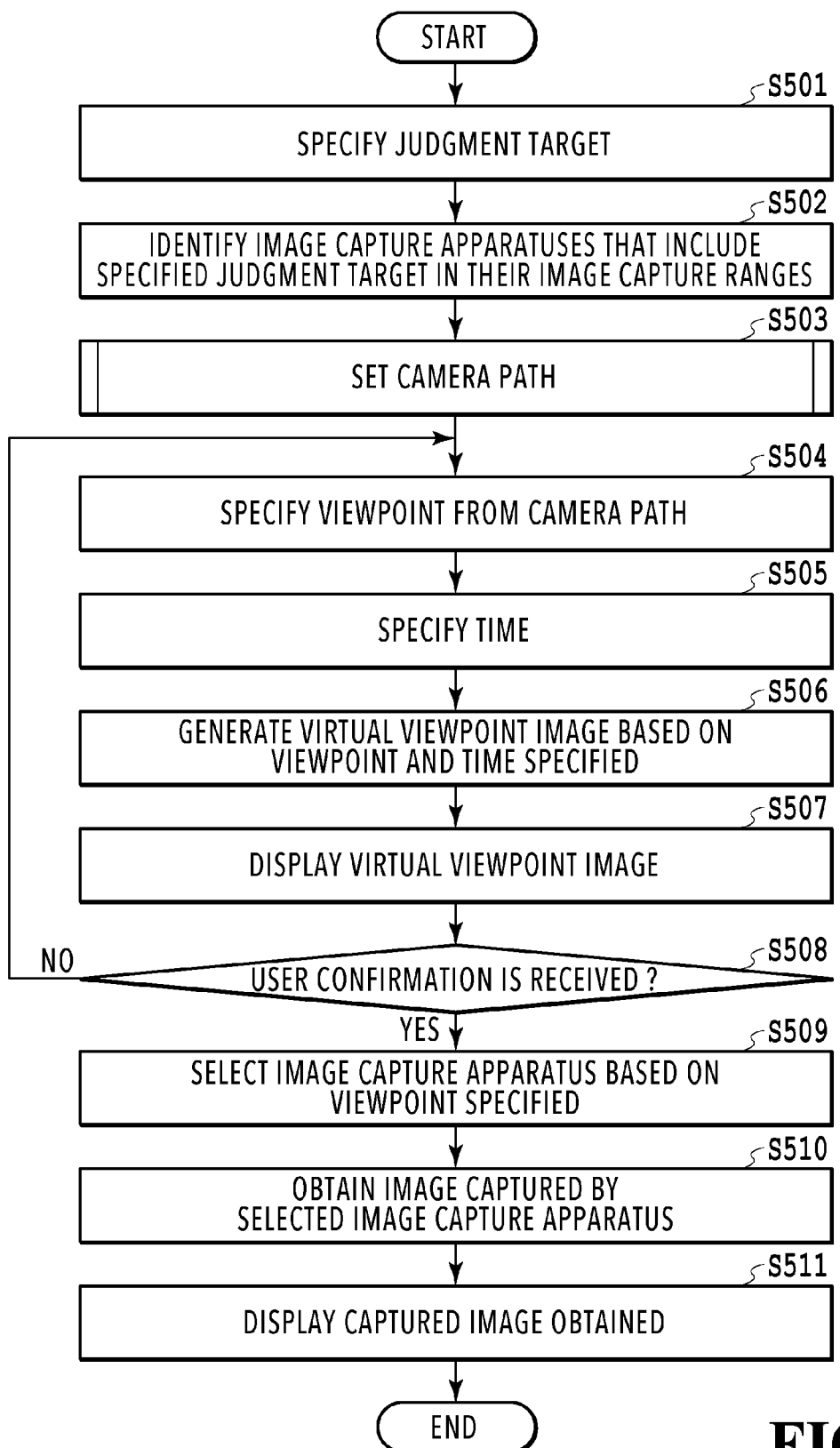
FIG. 5 is a flowchart illustrating a procedure of processing performed by the image processing apparatus.

FIG. 5 is a flowchart illustrating a sequence of steps of processing performed by the image processing apparatus 1. The series of steps of the processing shown in the flowchart in FIG. 5 are performed by the CPU of the image processing apparatus 1 by loading program code stored in the ROM into the RAM and executing the program code. Also, some or all of the functions in the steps in FIG. 5 may be implemented by hardware such as an ASIC or an electric circuit. Note that the letter "S" used in the description of processing denotes "Step" in the flowchart, and this applies to the other flowchart below.

The image processing apparatus 1 of the present embodiment is an image processing apparatus for assisting a referee in a competitive sport in making a judgment and performs processing to select, from the plurality of image capture apparatuses 301, an image capture apparatus that captured an image useful for making the judgments.

In S501, based on a user input, the judgment target specifying unit 207 specifies the position of a judgment target in the image capture space 302. For example, in a case where a user makes a judgment (an instant-replay judgment) based on a captured image of a scene involving a plurality of players, the center position of those players is inputted as a judgment target. Alternatively, the position of a goal or the like may be the position of a judgment target. For example, a judgment target is designated by a user by inputting the coordinates of the position of the judgment target by operating the operation unit 106.

In S502, from the plurality of image capture apparatuses 301 that capture images of the image capture space 302, the identifying unit 208 identifies image capture apparatuses whose image capture range includes the judgment target specified in S501. The identifying unit 208 identifies the image capture apparatuses whose image capture range includes the judgment target by, for example, using perspective projection models to calculate, for each of the image capture apparatuses, whether the judgment target is projected within the image capture range of the image capture apparatus. Note that from the image capture apparatuses that include the judgment target in their image capture ranges, the identifying unit 208 may select only an image capture apparatus having the judgment target projected at the center of the image capture range thereof (or within a range of a predetermined distance from the image center) and identify such an image capture apparatus.

In S503, the camera path setting unit 209 sets a camera path. A camera path is an arrangement of a plurality of viewpoints and is formed by a plurality of viewpoints. The viewpoints also include a virtual viewpoint which is not the viewpoint of an actual image capture apparatus.

Figure 6:
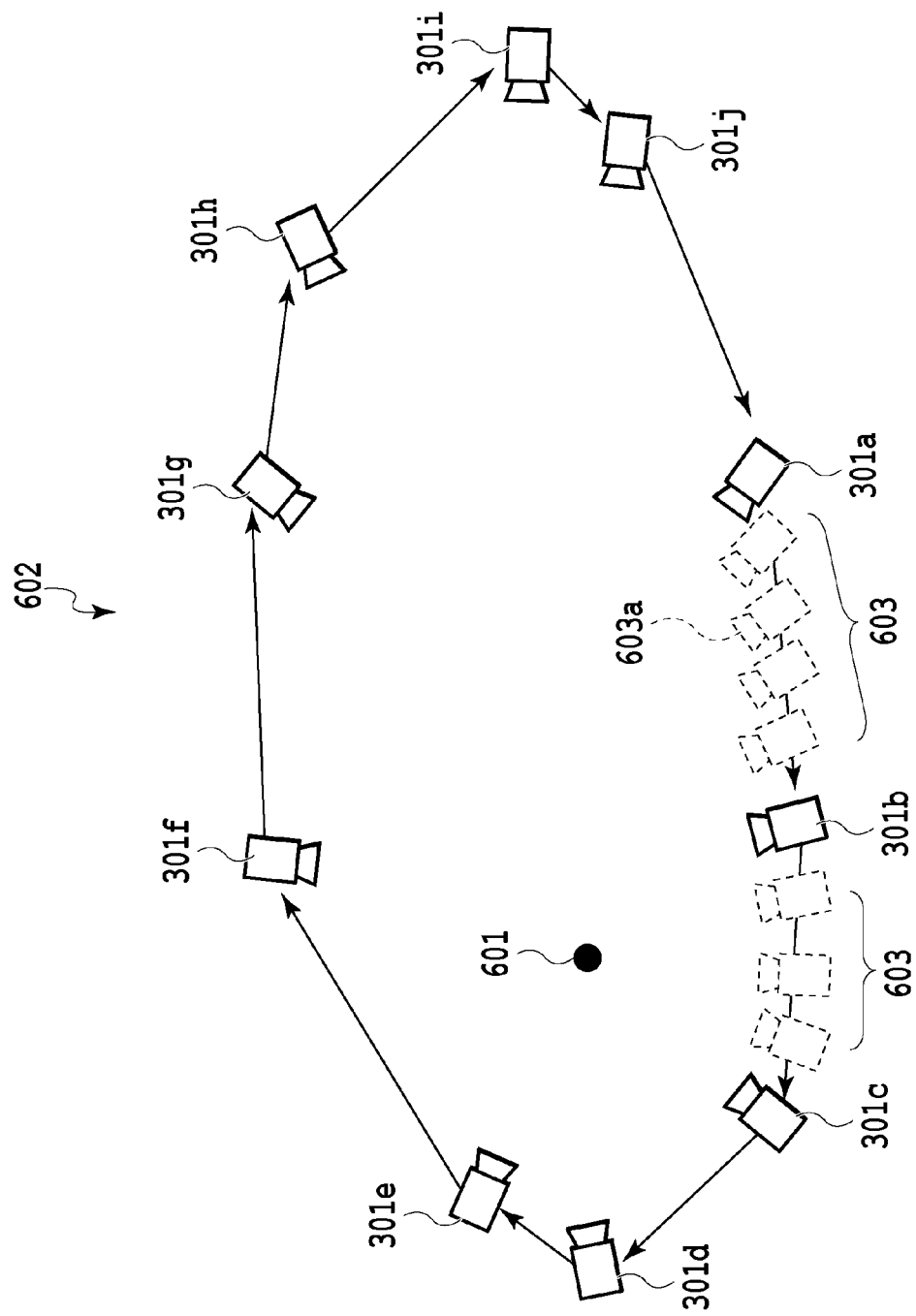
FIG. 6 is a diagram illustrating a camera path.

FIG. 6 is a diagram illustrating a camera path 602. Viewpoints 301*a* to 301*j* are viewpoints (positions and orientations) of the image capture apparatuses identified from the plurality of image capture apparatuses 301 in S502. In this way, the camera path generated in this step includes viewpoints based on the image capture apparatuses identified in S502. Although the viewpoints 301*a* to 301*j* in FIG. 6 represent the viewpoints of the image capture apparatuses identified in S502, the viewpoints 301*a* to 301*j* of the image capture apparatuses identified in S502 may be adjusted, in which case the camera path includes the viewpoints thus adjusted, as will be described later.

Viewpoints 603 in FIG. 6 are viewpoints interpolated between neighboring viewpoints. FIG. 6 omits some of the viewpoints set for interpolation. In this way, the camera path setting unit 209 sets the camera path 602 formed by, in principle, viewpoints based on the identified image capture apparatuses and viewpoints interpolated between the viewpoints based on those image capture apparatuses, the camera path 602 making a full circle surrounding a judgment target 601. Note that the viewpoint interpolation may be omitted by a user instruction. A procedure for setting a camera path will be described in detail later.

Next, the following steps S504 to S508 are loop processing and are steps for generating and displaying a virtual viewpoint image of one frame based on the images captured by the plurality of image capture apparatuses 301. Specifically, one of the viewpoints forming the camera path is specified, and a virtual viewpoint image showing the view from the viewpoint is generated and displayed. In a case where a user issues no instruction to confirm the virtual viewpoint image after the generated virtual viewpoint image is displayed, the next one of the viewpoints forming the camera path is then specified, and a virtual viewpoint image showing the view from that viewpoint is generated and displayed. Such processing is repeated. By repeating the processing in S504 to S508, virtual viewpoint images showing the views from the viewpoint moving along the camera path set in S503 are displayed on the display unit 105.

In S504, the viewpoint specifying unit 210 specifies one of the viewpoints forming the camera path set in S503. In the processing in S504 in the next loop processing, the viewpoint specifying unit 210 specifies another one of the viewpoints forming the camera path which is next to the previously specified viewpoint, sequentially clockwise. Alternatively, the viewpoint specifying unit 210 may specify a viewpoint by moving the viewpoint from one to another of the viewpoints forming the camera path as operated by a user.

In S505, the viewpoint specifying unit 210 specifies a time for which to generate a virtual viewpoint image. For example, in a case where a user has already specified the time of the scene on which to make an instant-replay judgment, that time is specified. Then, in processing in S505 in the next loop processing, a time ahead of the previously specified time by a predetermined period of time is specified. For example, in the processing in S505 in the next loop processing, a time ahead of the previously-specified time by one frame is specified. It is also possible to specify a time behind the previously-specified time. In this way, a time for which to generate a virtual viewpoint image is specified by moving ahead or behind the time in accordance with a user operation. Since the viewpoint specifying unit 210 changes the time to specify, a virtual viewpoint image at a time corresponding to a scene that a user wants to check can be generated even in a case where the time specified by the user is not the time corresponding to the scene that the user wants to check. Alternatively, the viewpoint specifying unit 210 may keep specifying the same time as the previously specified time in the next loop processing.

In S506, the virtual viewpoint image generating unit 204 generates a virtual viewpoint image which is an image corresponding to the time specified in S505 and showing the view from the viewpoint specified in S504. First, from the three-dimensional model managing unit 203, the virtual viewpoint image generating unit 204 obtains three-dimensional models (also referred to as three-dimensional data) showing the three-dimensional shapes of objects in the image capture space 302.

For example, the three-dimensional models are generated by the three-dimensional model generating unit 202 as follows. First, the three-dimensional model generating unit 202 obtains captured images (frames) corresponding to a generation-target time from moving images captured by the plurality of image capture apparatuses 301 and managed by the captured image managing unit 206. The three-dimensional model generating unit 202 detects object regions from the obtained captured images which are captured from a plurality of viewpoints and correspond to one frame. The objects are detected based on, for example, differences from the background image. Then, the three-dimensional model generating unit 202 generates silhouette images showing the shapes of the objects and texture images representing the textures of the objects cut out from the captured images. Then, using, for example, the visual hull method, the three-dimensional models of the objects corresponding to the generation-target time are generated using the silhouette images. Since the viewpoint information on the plurality of image capture apparatuses 301 is needed in this event, actual camera parameters managed by the viewpoint information managing unit 211 are used.

In the present embodiment, the three-dimensional model generating unit 202 generates three-dimensional models in parallel with the image capture by the plurality of image capture apparatuses 301, and the three-dimensional model managing unit 203 stores the generated three-dimensional models in a storage unit and manages them. Thus, in S506, the virtual viewpoint image generating unit 204 can obtain three-dimensional models corresponding to the time specified in S505 from the three-dimensional model managing unit 203.

Note that the three-dimensional model generating unit 202 may generate the three-dimensional models not in advance but in this step by obtaining captured images corresponding to the time specified in S505. In this case, in a case where the time specified in S505 is the same as the time specified in the previous loop processing, then in this step, three-dimensional models previously generated can be obtained, and a virtual viewpoint image can be generated based on the obtained three-dimensional models. Since three-dimensional models thus need to be generated only once, the load for the processing to generate virtual viewpoint images can be reduced in a case where the same time as the previously-specified time is specified in S505.

Next, the virtual viewpoint image generating unit 204 renders the three-dimensional models of the objects so as to produce an image as viewed from the viewpoint specified in S504. Specifically, using the texture images corresponding to the time specified in S505, coloring processing is performed on the three-dimensional models as viewed from the viewpoint specified in S504. A virtual viewpoint image of one frame is thus generated.

In S507, the virtual viewpoint image display controlling unit 205 displays the virtual viewpoint image generated in S506 on the display unit 105. The virtual viewpoint image display controlling unit 205 may display the virtual viewpoint image along with predetermined information or the like that allows a user to identify that the viewpoint specified in S504 (the viewpoint corresponding to the virtual viewpoint image being displayed) is close to one of the plurality of image capture apparatuses 301.

In S508, the viewpoint specifying unit 210 determines whether a user confirmation (designation) is received. In a case where a user confirms that the virtual viewpoint image currently displayed on the display unit 105 includes a scene to be checked (e.g., a foul scene) and that the virtual viewpoint image is an image from a desired viewpoint, the user makes a predetermined input using the operation unit 106 to indicate the confirmation. For example, in a case where a user does not make a predetermined input even after a predetermined period of time passes since the virtual viewpoint image has started to be displayed, the viewpoint specifying unit 210 may determine that no user confirmation is received. Alternatively, in a case where the virtual viewpoint image does not include a scene to be checked, the viewpoint specifying unit 210 may receive an input indicative of that from a user.

If no user confirmation is received (NO in S508), processing proceeds back to S504, and in S504, the viewpoint specifying unit 210 specifies the next one of the viewpoints forming the camera path and repeats S505 to S508.

Meanwhile, if a user confirmation is received (YES in S508), processing proceeds to S509. In S509, from the image capture apparatuses identified by the identifying unit 208 in S502, the image capture apparatus selecting unit 212 selects an image capture apparatus located closest to the viewpoint specified in S504. Specifically, from the image capture apparatuses identified in S502, the image capture apparatus selecting unit 212 selects an image capture apparatus located closest to the viewpoint used to generate the virtual viewpoint image that the virtual viewpoint image display controlling unit 205 is currently displaying on the display unit 105. Note that this is not the only method for selecting the image capture apparatus. For example, an image capture apparatus that captures images in an image capturing direction closest to the eye direction from the viewpoint specified may be selected. Alternatively, for example, comparisons may be made between parameters for both the position and the image capturing direction of each of the image capture apparatuses identified in S502 and parameters for both the position of the specified viewpoint and the eye direction from the specified viewpoint. And with differences for both parameters taken into consideration, an image capture apparatus with the smallest differences may be selected. In this way, the image capture apparatus may be selected based on at least one of the position of the specified viewpoint and the eye direction from the specified viewpoint.

For example, a case is assumed here where the camera path 602 in FIG. 6 is generated in S503, a viewpoint 603a is specified from the viewpoints forming the camera path 602, and a user confirmation is received while a virtual viewpoint image viewed from the viewpoint 603a is being displayed. In this case, an image capture apparatus having the viewpoint 301a which is closest to the viewpoint 603a among the viewpoints 301a to 301j of the image capture apparatuses identified in S502 is selected.

Note that more than one image capture apparatus may be selected in this step. For example, a predetermined number of (e.g., two) image capture apparatuses may be selected in order of nearness to the viewpoint corresponding to the virtual viewpoint image specified by a user. Alternatively, for example, in a case where the viewpoint specified is a viewpoint interpolated between two image capture apparatuses, the image capture apparatus selecting unit 212 may select those two image capture apparatuses. In a case where, for example, a specified viewpoint is the viewpoint 603a interpolated between the viewpoints 301a and 301b of image capture apparatuses in the case of the camera path 602 in FIG. 6, the image capture apparatus selecting unit 212 may select two image capture apparatuses having the viewpoints 301a and 301b in this step. Also, for example, one or more image capture apparatuses may be selected whose at least one of position and image capturing direction has a difference of a predetermined threshold or below from the position of the specified viewpoint or the eye direction from the specified viewpoint.

In S510, from the captured image managing unit 206, the selected image obtaining unit 213 obtains the captured image captured by the image capture apparatus selected by the image capture apparatus selecting unit 212, the image captured corresponding to the time specified in S505. In other words, a captured image at a time corresponding to the virtual viewpoint image being displayed on the display unit 105 at the moment where a user confirmation is received in S508 is obtained. Alternatively, from images captured by the image capture apparatus selected by the image capture apparatus selecting unit 212, a plurality of captured images may be obtained that correspond to a period of time including the time specified in S505.

In S511, the captured image display controlling unit 214 displays the image obtained in S510. Note that the captured image display controlling unit 214 may display the image obtained in S510 on a display unit different from the display unit 105. The image capture apparatus selected by the image capture apparatus selecting unit 212 is an image capture apparatus that captures images of a scene that the user wants to check, from a viewpoint which is the same as or closer to a desired viewpoint. Thus, a captured image useful to an instant-replay judgment can be displayed.

[Camera Path Setting Processing]

Figure 7:
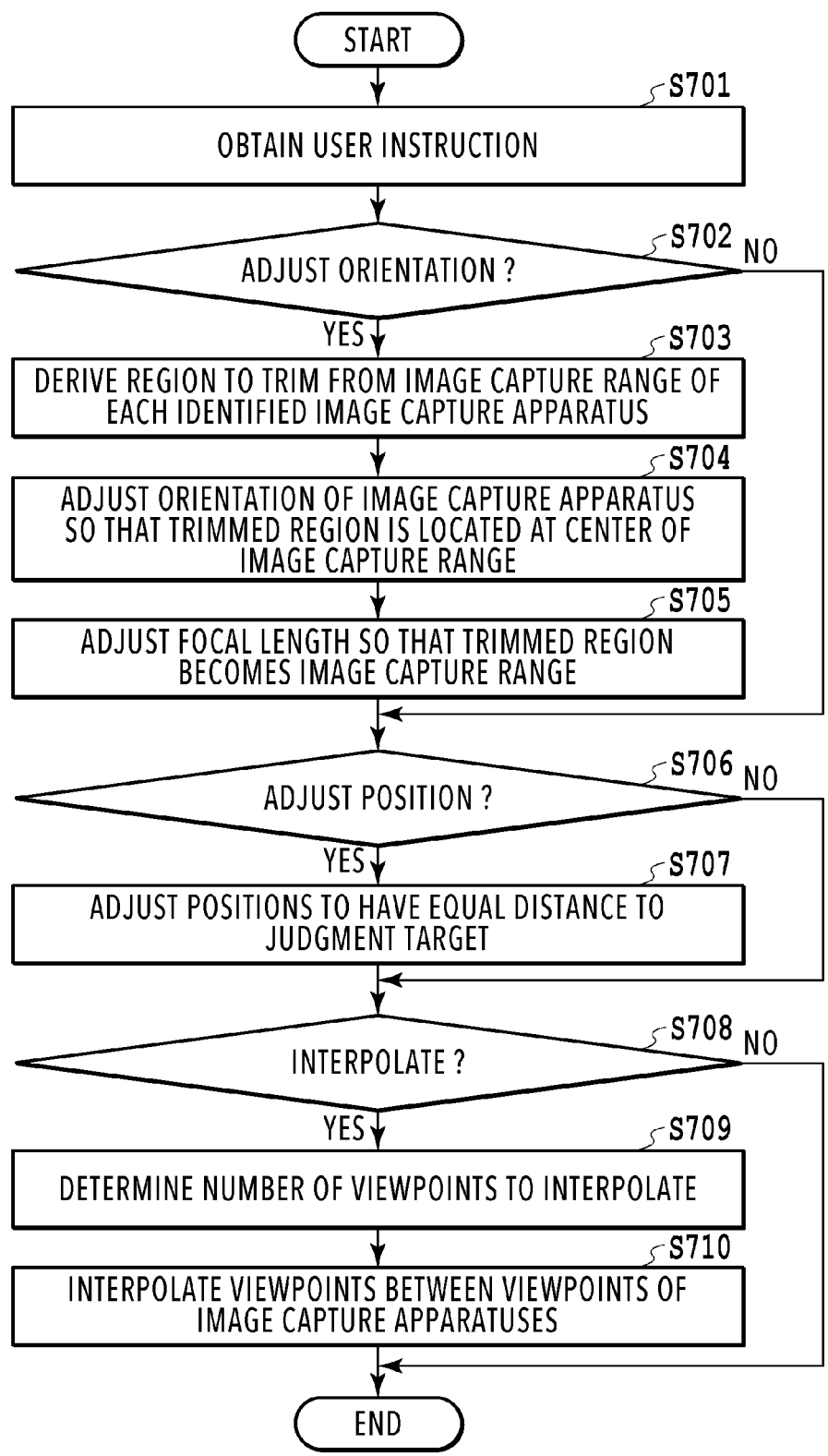
FIG. 7 is a flowchart illustrating camera path setting processing.

FIG. 7 is a flowchart illustrating details of the camera path setting processing in S503.

Using the operation unit 106, a user inputs instructions regarding a camera path used to generate virtual viewpoint images. In S701, the camera path setting unit 209 obtains user instructions regarding a camera path. For example, the user instructions include at least the following three items.

Whether to adjust parameters indicating the orientations of the respective image capture apparatuses identified by the identifying unit 208.

Whether to adjust parameters indicating the positions of the respective image capture apparatuses identified by the identifying unit 208.

Whether to interpolate viewpoints between image capture apparatuses.

The camera path 602 in FIG. 6 is an example camera path generated without adjustment of the positions and orientations of the image capture apparatuses identified by the identifying unit 208. To accurately select an image capture apparatus that captures images from a viewpoint desired by a user, it is preferable not to adjust the parameters of the positions and orientations of the image capture apparatuses identified by the identifying unit 208. However, the image capture apparatuses identified by the identifying unit 208 may be located away from each other and oriented in various directions. Then, it may be hard for the user to check virtual viewpoint images that are generated to show the views from the camera path formed by connecting the viewpoints of the identified image capture apparatuses because there are large changes among the virtual viewpoint images.

Thus, in the present embodiment, the camera path setting unit 209 can set not only the camera path 602 shown in FIG. 6, but also a camera path by adjusting parameters representing the orientations and positions of the image capture apparatuses identified by the identifying unit 208 and interpolating viewpoints represented by the adjusted parameters. Although the camera path 602 in FIG. 6 is an example of a camera path set by interpolating viewpoints between the viewpoints of the image capture apparatuses identified by the identifying unit 208, the camera path can be set without viewpoint interpolation in the present embodiment in accordance with a user instruction.

In S702, the camera path setting unit 209 determines whether input values indicating the user instructions obtained in S701 include an instruction to adjust parameters indicative of orientation. If the input values include an instruction to adjust orientation parameters (YES in S702), processing proceeds to S703.

In S703, the camera path setting unit 209 derives a region to trim part of the image capture range of each of the image capture apparatuses identified in S502. An image showing a cropped region is referred to as a trimmed image. Regions to trim are derived so that the judgment target specified in S501 may be projected at the same coordinates on the trimmed images trimmed from the image capture ranges of the image capture apparatuses.

Figure 8A:
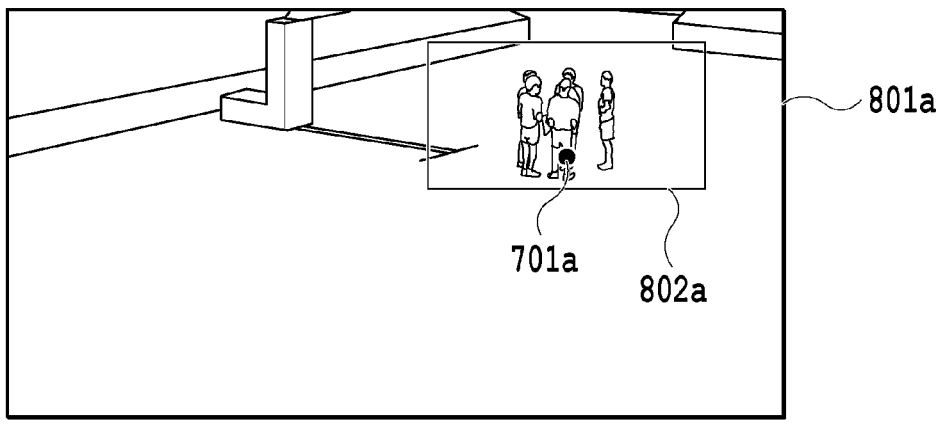
FIGS. 8A to 8C are diagrams illustrating trimming.
Figure 8B:
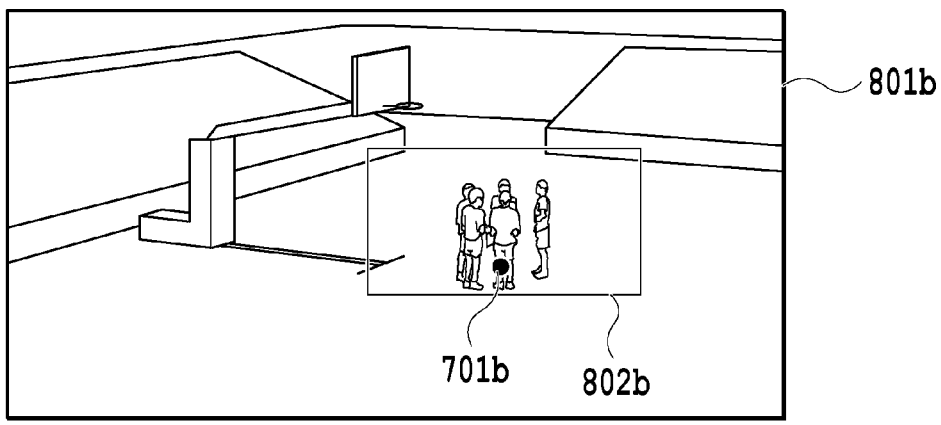
Figure 8C:
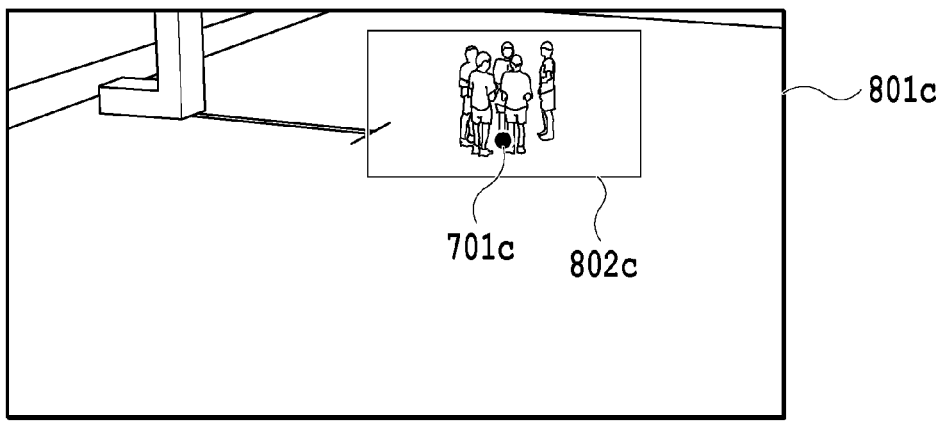

FIGS. 8A to 8C are diagrams each illustrating a trimmed image. Images 801a to 801c are images representing the image capture ranges of the respective image capture apparatuses identified in S502. In other words, the images 801a to 801c represent the image capture ranges of the image capture apparatuses that are different from one another.

Positions 701a to 701c are the positions of the judgment target 601 on the images 801a to 801c, respectively. Since the image capture apparatuses identified in S502 are different in their positions and orientations, the judgment target 601 is projected onto different coordinates on the images 801a to 801c.

A trimmed image 802a in FIG. 8A is an image representing a region trimmed from the image 801a. Similarly, a trimmed image 802b in FIG. 8B and a trimmed image 802c in FIG. 8C represent regions trimmed from the image 801b and the image 801c, respectively. Regions to trim are derived in this step so that the judgment target 601 may be projected onto the same coordinates on the trimmed images 802a to 802c. In other words, the positions 701a to 701c are located on the same coordinates on the trimmed images 802a to 802c.

Figure 9:
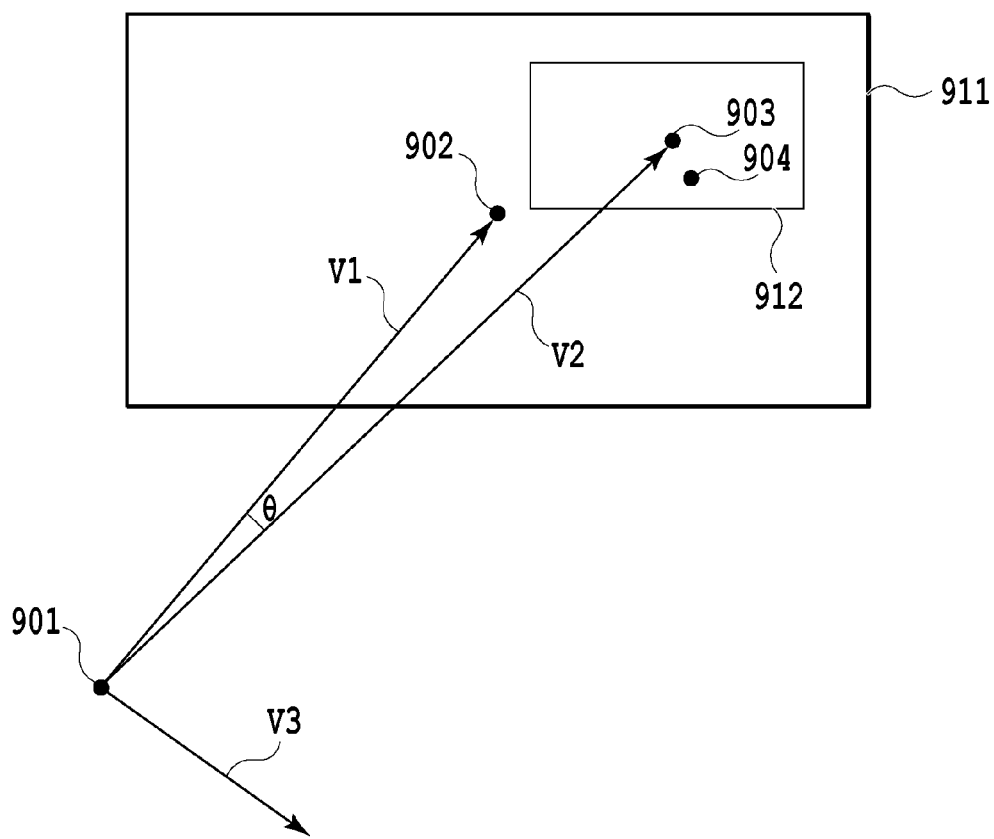
FIG. 9 is a diagram illustrating adjustment of the orientation of an image capture apparatus.

FIG. 9 is a diagram illustrating adjustment of a parameter representing the orientation of an image capture apparatus. Using FIG. 9, a description is given of a method for deriving a region to trim from an image capture range. An image 911 in FIG. 9 is an image representing the image capture range of one of the image capture apparatuses identified by the identifying unit 208, and a trimmed image 912 is an image representing a region trimmed from the image 911. In the following description, the coordinate system used for the coordinates on an image is such that the origin is the upper left corner of the image, the horizontal direction extends in the X-direction, and the vertical direction extends in the Y-direction.

First, using a perspective projection model, the coordinates of a point on the image 911 where a position 904 of a judgment target is projected is found. The coordinates found is expressed as (xc, yc) here. The size of the trimmed image 912 is wt×ht pixels, and the coordinates of the projection point of the position 904 of the judgment target on the trimmed image 912 is (xt, yt). In this case, the coordinates of the position of the upper left corner of the trimmed image 912 is (xc−xt, yc−yt) on the image 911, and the coordinates of the position of the lower right corner of the trimmed image 912 is (xc−xt+wt, yc−yt+ht) on the image 911. In this way, coordinates indicative of the range of the trimmed image are derived from the image capture range of each of the image capture apparatuses.

In S704, the camera path setting unit 209 adjusts the parameters indicative of the orientations of the identified image capture apparatuses so that the center of the trimmed image may be at the center of the image capture range.

Using FIG. 9, a description is given of how to adjust a parameter representing the orientation of one of the image capture apparatuses identified in S502. In FIG. 9, a point 901 is the optical center of the image capture apparatus the image capture range of which is the image 911. A point 902 is the center of the image 911. A point 903 is the image center of the trimmed image 912 trimmed from the image 911. A vector v1 is a vector of the direction of the optical axis of the image capture apparatus the image capture range of which is the image 911. A vector v2 is a vector of the optical axis direction after adjustment of the orientation of the image capture apparatus the image capture range of which is the image 911. The size of the image 911 is wc×hc pixels, and the focal length of the image capture apparatus is f. Then, the vector v1 is expressed as follows:

$$v1 = (0, 0, f)$$

As described in relation to S703, the coordinates of the upper left corner of the trimmed image 912 is (xc−xt, yc−yt), and the coordinates of the lower right corner of the trimmed image 912 is (xc−xt+wt, yc−yt+ht). Thus, the coordinates of the position of the point 903 which is the image center of the trimmed image 912 is expressed as (xc−xt+wt/2, yc−yt+ht/2) on the image 911 representing the image capture range. Hence, the vector v2 is found by the following formula:

$$v2 = (xc - xt + wt/2 - wc/2, yc - yt + ht/2 - hc/2, f).$$

A vector v3 perpendicular to both of the vector v1 and the vector v2 can be found using the cross product. The vector v3 found is expressed as follows:

$$v3 = (x, y, z).$$

The rotation of the optical axis of the image capture apparatus as a result of the orientation adjustment is denoted by p. Using quaternions, p is expressed as follows:

$$p = (\cos(\theta/2), x \cdot \sin(\theta/2), y \cdot \sin(\theta/2), z \cdot \sin(\theta/2)).$$

θ is an angle formed between the vector v1 and the vector v2 and can be found using the dot product. With q being the orientation of an image capture apparatus before adjustment and q' being the orientation of the image capture apparatus after adjustment, the orientation q' after adjustment can be derived by the following formula:

$$q' = pq.$$

In S705, the camera path setting unit 209 adjusts the focal length of each of the image capture apparatuses identified in S502 so that the image capture range thereof may become the region represented by the trimmed image. The focal length after adjustment, denoted by f', can be found by the following formula:

$$f' = f \cdot wc/wt.$$

In this way, parameters indicating orientation are adjusted for each of the image capture apparatuses identified in S502. In response to a user instruction for orientation adjustment, a camera path connecting viewpoints after adjustment is generated. In a case where a region to crop is determined so that the judgment target may be projected onto the center of the trimmed image, the virtual viewpoint images representing the views from the respective adjusted viewpoints are generated such that the judgment target is near the center of the images. This makes it easier for the user to check the virtual viewpoint images. Thus, orientation adjustments can reduce the load on the user in checking the virtual viewpoint images.

After the processing in S705 ends or if the input values indicating the user instructions does not include an instruction to adjust parameters indicative of orientation (NO in S702), processing proceeds to S706.

In S706, the camera path setting unit 209 determines whether the input values indicating the user instructions includes an instruction to adjust parameters indicative of position. If an instruction to adjust parameters indicative of position is included (YES in S706), processing proceeds to S707.

In S707, the camera path setting unit 209 adjusts the parameters indicative of the positions of the image capture apparatuses identified in S502 so that the distances from the judgment target specified in S501 to the image capture apparatuses may be equal.

Figure 10:
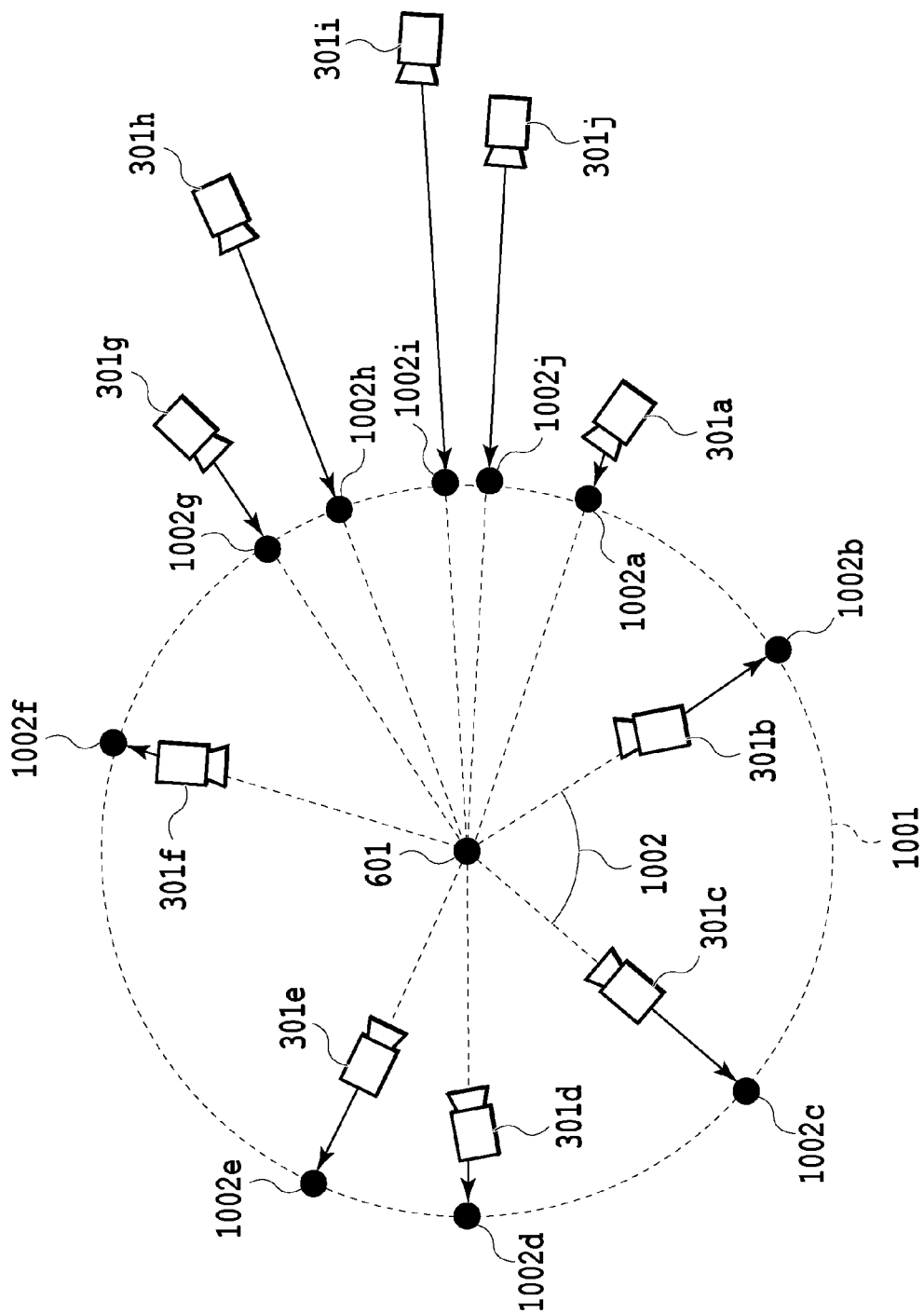
FIG. 10 is a diagram illustrating adjustment of the positions of image capture apparatuses.

FIG. 10 is a diagram illustrating adjustment of a parameter indicative of the position of an image capture apparatus. As in FIG. 6, the viewpoints 301a to 301j represent the pre-adjustment positions of the respective image capture apparatuses identified in S502. Meanwhile, points 1002a to 1002j are the positions of the image capture apparatuses indicated by adjusted parameters. In this step, the positions of the viewpoints corresponding to the respective image capture apparatuses identified in S502 are adjusted so as to be located on the circumference of a circle 1001 having the judgment target 601 at the center. The distance from the judgment target 601 to the positions of viewpoints after adjustment, i.e., the radius of the circle 1001, is determined as being, for example, the average of the pre-adjustment distances from the judgment target 601 to the respective image capture apparatuses identified.

In this way, in a case where adjustment of position parameters of the image capture apparatuses is instructed, a camera path formed by the viewpoints arranged along the circle 1001 is generated. In the pre-adjustment camera path in FIG. 6, some image capture apparatuses are away from their neighboring image capture apparatuses. Thus, a camera path formed by connecting the pre-adjustment viewpoints may include large changes in viewpoints, which may put a load on a user in checking the images. Thus, a camera path is generated using viewpoints corresponding to the adjusted positions of the image capture apparatuses, so that the virtual viewpoint images are generated with their corresponding viewpoints having a uniform distance to the judgment target. Thus, a load on a user in checking virtual viewpoint images can be reduced.

After the processing in S707 ends or if the input values indicating the user instructions do not include an instruction to adjust position parameters (NO in S706), processing proceeds to S708.

In S708, the camera path setting unit 209 determines whether the input values indicating user instructions include an instruction to generate a camera path by interpolating viewpoints between the image capture apparatuses. If an instruction for interpolation is included (YES in S708), processing proceeds to S709.

In S709, the camera path setting unit 209 determines the number of viewpoints 603 to interpolate between the image capture apparatuses identified in S502. The processing procedure is described below. It is assumed here that virtual viewpoint images are generated to display moving images such that the viewpoint moves along the camera path and makes a full circle in eight seconds. It is also assumed here that the frame rate is 60 frames per second (fps). In this case, the number of viewpoints necessary to form a camera path is 480 (=8×60). The total number N of the viewpoints to newly set for interpolation can be found to be N=480−c, where c is the number of image capture apparatuses identified in S502.

The number of viewpoints to interpolate between neighboring image capture apparatuses is determined by distributing N in proportion to an angle $\varphi$ between the image capturing apparatuses identified in S502. For example, in a case where the viewpoints 301a to 301j of the image capture apparatuses are located as shown in FIG. 10, the number of viewpoints to set for interpolation between the viewpoint 301b and the viewpoint 301c is found to be N×$\varphi$/360, where $\varphi$ is an angle 1002 formed between the viewpoint 301b and the viewpoint 301c.

In S710, the camera path setting unit 209 sets new viewpoints so that as many viewpoints as derived in S709 may be interpolated between the viewpoints corresponding to neighboring image capture apparatuses. The camera path setting unit 209 finds the positions of the viewpoints 603 newly set by interpolation by linear interpolation between the image capture apparatuses on both sides. Also, the focal length of each viewpoint 603 set by interpolation is found by linear interpolation between the positions of the image capture apparatuses on both sides. The orientation of each viewpoint 603 set by interpolation is found by spherical linear interpolation between the orientations of the image capture apparatuses on both sides. In this way, in a case where a user issues an instruction to interpolate viewpoints, the camera path setting unit 209 sets a camera path formed by viewpoints based on the image capture apparatuses identified and viewpoints set by interpolation. Note that in a case where parameters representing the positions and orientations of the viewpoints of the image capture apparatuses are adjusted, viewpoints are interpolated between the viewpoints represented by the adjusted parameters.

By being generated based on such a viewpoint-interpolated camera path and displayed successively, the virtual viewpoint images can be displayed as if moving images were captured from a camera smoothly moving along the camera path.

Meanwhile, if an instruction for interpolation is not included (NO in S708), the camera path setting processing is ended. In this case, no viewpoint interpolation is performed, and thus a camera path connecting the viewpoints of the actual image capture apparatuses or the adjusted viewpoints of the actual image capture apparatuses is generated. Thus, the virtual viewpoint images showing the views from the viewpoints of the actual cameras are displayed, so that an image capture apparatus that has an image capture range similar to the virtual viewpoint image confirmed by the user in S508 can be selected.

As thus described, in the present embodiment, an image capture apparatus to be used for an instant-replay judgment is selected using virtual viewpoint images showing the views from a camera path making a full circle surrounding a judgment target. Thus, according to the present embodiment, even in a case where the number of image capture apparatuses usable for an instant-replay judgment increases, a load on a user in selecting a desired image capture apparatus can be reduced. Thus, in a case where an instant-replay judgment is made using image capture apparatuses that capture images of an image capture space from various directions, a captured image of an instant-replay judgment target captured from a desired direction by an image capture apparatus can be used.

<Other Embodiments>

Although virtual viewpoint images are generated by the image processing apparatus 1 in the embodiment described above, virtual viewpoint images may alternatively be generated by one or more apparatuses different from the image processing apparatus 1. In this case, the image processing apparatus may sequentially obtain the virtual viewpoint images generated by the different apparatus(es). For example, generation of three-dimensional models and generation of virtual viewpoint images may be performed by different apparatuses.

Note that the object of the technique of the present disclosure can be achieved also by supplying a system or an apparatus with a recording medium recording program code of software for implementing the functions of the embodiment described above. In this case, a computer (a CPU or an MPU) in that system or apparatus reads and executes the program code stored in the storage medium. Then, the program code itself read from the storage medium implements the functions of the embodiment described above, and the storage medium storing the program code forms the technique of the present disclosure.

Examples of a storage medium usable for supplying the program code include a flexible disk, a hard disk, an optical disk, a magneto-optical disk, a CD-ROM, a CD-R, a magnetic tape, a nonvolatile memory card, and a ROM.

The object of the technique of the present disclosure also includes a case where an operating system (OS) or the like operating on a computer executes part or all of the actual processing to implement the functions of the embodiment described above based on the instructions of the program code read by the computer.

The program code read from a storage medium may be written to a memory in a functionality extension board inserted into a computer or a functionality extension unit connected to a computer. In this case, the object of the techniques of the present disclosure also includes a case where a CPU or the like in the functionality extension board or the functionality extension unit executes part or all of the actual processing for implementing the functions of the embodiment described above based on the instructions of the program code.

The technique of the present disclosure can reduce the work involved in finding an image capture apparatus that has captured an image from a desired viewpoint among a plurality of image capture apparatuses.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-063433 filed Apr. 2, 2021, which is hereby incorporated by reference wherein in its entirety.

What is claimed is:

1. An image processing apparatus comprising:
at least one processor or circuit configured to function as:
an identifying unit configured to identify, from a plurality of existent image capture apparatuses that capture images of an object present in an image capture space from a plurality of directions, two or more existent image capture apparatuses that capture images of a predetermined position in the image capture space;
a setting unit configured to set a plurality of virtual viewpoints including a viewpoint corresponding to positions of the two or more existent image capture apparatuses identified by the identifying unit and a viewpoint in a position where the existent image capture apparatuses do not exist;
a generating unit configured to generate a plurality of virtual viewpoint images showing views from each of the plurality of virtual viewpoints based on data showing a three-dimensional shape of the object generated using a plurality of existent images captured by the plurality of image capture apparatuses; and
a selecting unit configured to select an image capture apparatus from the two or more existent image capture apparatuses identified by the identifying unit based on at least one of position of a virtual viewpoint used to generate a virtual viewpoint image designated by a user from the plurality of virtual viewpoint images and eye direction from the virtual viewpoint used to generate the virtual viewpoint image designated by a user from the plurality of virtual viewpoint images.

2. The image processing apparatus according to claim 1, wherein
the selecting unit selects an image capture apparatus located closest to the virtual viewpoint used to generate the virtual viewpoint image designated by the user from the two or more existent image capture apparatuses identified by the identifying unit.

3. The image processing apparatus according to claim 1, wherein
the selecting unit selects a predetermined number of image capture apparatuses in order of nearness to the virtual viewpoint used to generate the virtual viewpoint image designated by the user from the two or more existent image capture apparatuses identified by the identifying unit.

4. The image processing apparatus according to claim 1, wherein
the setting unit sets the plurality of virtual viewpoints including a virtual viewpoint interpolated between the viewpoints corresponding to positions of the two or more existent image capture apparatuses identified by the identifying unit.

5. The image processing apparatus according to claim 1, wherein
the setting unit sets the plurality of virtual viewpoints by adjusting parameters representing the viewpoints of the two or more existent image capture apparatuses identified by the identifying unit and by including viewpoints represented by the adjusted parameters.

6. The image processing apparatus according to claim 5, wherein
the setting unit derives regions in which the predetermined position is projected onto same coordinates from image capture ranges of the respective two or more existent image capture apparatuses identified by the identifying unit and adjusts the parameters representing the viewpoints of the two or more existent image capture apparatuses so that the two or more existent image capture apparatuses have orientations facing in directions toward the regions corresponding to the respective image capture apparatuses.

7. The image processing apparatus according to claim 5, wherein
the setting unit adjusts the parameters representing the viewpoints of the two or more existent image capture apparatuses identified by the identifying unit so that the viewpoints of the two or more existent image capture apparatuses identified by the identifying unit have an equal distance to the predetermined position.

8. The image processing apparatus according to claim 1, wherein the at least one processor or circuit further functions as:
a first display controlling unit configured to perform control so that the virtual viewpoint images generated by the generating unit are displayed on a display unit, wherein
the virtual viewpoint image designated by the user is a virtual viewpoint image being displayed on the display unit at a moment where the user makes a predetermined input.

9. The image processing apparatus according to claim 8, wherein
the first display controlling unit displays, on the display unit, information on an image capture apparatus closest to the virtual viewpoint used to generate the virtual viewpoint image being displayed on the display unit among the two or more existent image capture apparatuses identified by the identifying unit.

10. The image processing apparatus according to claim 1, wherein the at least one processor or circuit further functions as:
    a managing unit configured to manage images captured by the plurality of existent image capture apparatuses;
    an obtaining unit configured to obtain, from the managing unit, an image captured by the image capture apparatus selected by the selecting unit; and
    a second display controlling unit configured to display the image obtained by the obtaining unit on a display unit.

11. The image processing apparatus according to claim 1, wherein
    the identifying unit identifies, from the plurality of existent image capture apparatuses, an image capture apparatus whose image capture range includes the predetermined position within a predetermined range from a center of the image capture range.

12. The image processing apparatus according to claim 1, wherein the at least one processor or circuit further functions as:
    a specifying unit configured to specify one of the plurality of virtual viewpoints, wherein
    the generating unit generates a virtual viewpoint image showing a view from the virtual viewpoint specified by the specifying unit,
    in a case where the user does not designate the virtual viewpoint image showing a view from the virtual viewpoint specified by the specifying unit, processing is repeated in which the specifying unit specifies a next one of the plurality of virtual viewpoints and the generating unit generates a virtual viewpoint image showing a view from the specified virtual viewpoint.

13. The image processing apparatus according to claim 12, wherein
    the specifying unit additionally specifies a time,
    the generating unit generates, based on data showing the three-dimensional shape generated using images captured corresponding to the time specified by the specifying unit, the viewpoint image showing a view from the virtual viewpoint specified by the specifying unit,
    in a case where the user does not designate the virtual viewpoint image showing a view from the virtual viewpoint specified by the specifying unit, processing is repeated in which the specifying unit specifies a time different from the time previously specified and specifies a next one of the plurality of virtual viewpoints and the generating unit generates, based on data showing the three-dimensional shape generated using images captured corresponding to the specified time, the plurality of virtual viewpoint images showing views from each of the plurality of virtual viewpoints.

14. The image processing apparatus according to claim 1, wherein
    the generating unit generates, based on data showing the three-dimensional shape generated using images captured corresponding to a same time, the plurality of virtual viewpoint images showing views from each of the plurality of virtual viewpoints.

15. The image processing apparatus according to claim 1, wherein
    the predetermined position is specified based on a user instruction.

16. The image processing apparatus according to claim 1, wherein
    the image capture apparatus selected by the selecting unit is used to for making a judgment in a competitive sport.

17. An image processing method comprising:
    identifying, from a plurality of existent image capture apparatuses that capture images of an object present in an image capture space from a plurality of directions, two or more existent image capture apparatuses that capture images of a predetermined position in the image capture space;
    setting a plurality of virtual viewpoints including a viewpoint corresponding to positions of the identified two or more existent image capture apparatuses;
    generating a plurality of virtual viewpoint images showing views from each of the plurality of virtual viewpoints based on data showing a three-dimensional shape of the object generated using a plurality of existent images captured by the plurality of image capture apparatuses; and
    selecting an image capture apparatus from the identified two or more existent image capture apparatuses based on at least one of position of a virtual viewpoint used to generate a virtual viewpoint image designated by a user from the plurality of virtual viewpoint images and eye direction from the virtual viewpoint used to generate the virtual viewpoint image designated by a user from the plurality of virtual viewpoint images.

18. A non-transitory computer readable storage medium storing a program which causes a computer to perform an image processing method, the image processing method comprising:
    identifying, from a plurality of existent image capture apparatuses that capture images of an object present in an image capture space from a plurality of directions, two or more existent image capture apparatuses that capture images of a predetermined position in the image capture space;
    setting a plurality of virtual viewpoints including a viewpoint corresponding to positions of the identified two or more existent image capture apparatuses;
    generating a plurality of virtual viewpoint images showing views from each of the plurality of virtual viewpoints based on data showing a three-dimensional shape of the object generated using a plurality of existent images captured by the plurality of image capture apparatuses; and
    selecting an image capture apparatus from the identified two or more existing image capture apparatuses based on at least one of position of a virtual viewpoint used to generate a virtual viewpoint image designated by a user from the plurality of virtual viewpoint images and eye direction from the virtual viewpoint used to generate the virtual viewpoint image designated by a user from the plurality of virtual viewpoint images.

\* \* \* \* \*